(12) United States Patent
Mossner et al.

(10) Patent No.: US 7,850,031 B2
(45) Date of Patent: Dec. 14, 2010

(54) HOUSING (75) Inventors: Frank Mossner, Berlin (DE); Ferenc Nad, Berlin (DE); Ulrich Hetzer, Berlin (DE)

(73) Assignees: ADC GmbH, Berlin (DE); Harting Electric GmbH & Co. KG, Espelkamp (DE)

( * ) Notice: Subject to any disclaimer, the term of this patent is extended or adjusted under 35 U.S.C. 154(b) by 769 days.

(21) Appl. No.: 10/577,772

(22) PCT Filed: Oct. 27, 2004

(86) PCT No.: PCT/EP2004/012136
§ 371 (c)(1),
(2), (4) Date: Apr. 2, 2007

(87) PCT Pub. No.: WO2005/043704
PCT Pub. Date: May 12, 2005

(65) Prior Publication Data
US 2008/0041854 A1 Feb. 21, 2008

(30) Foreign Application Priority Data
Oct. 29, 2003 (DE) ................. 103 50 433

(51) Int. Cl.
*B65D 6/28* (2006.01)
*B65D 8/18* (2006.01)
*H02G 3/08* (2006.01)
(52) U.S. Cl. ...................... 220/4.02; 220/3.8
(58) Field of Classification Search ............. 220/3.8, 220/4.03, 4.22, 4.23; 16/321, 374–376; 174/66, 174/67, 266, 267
See application file for complete search history.

(56) References Cited

U.S. PATENT DOCUMENTS

| 3,654,663 | A  | * | 4/1972 | Algotsson ............... 16/230 |
| 5,571,023 | A  |   | 11/1996 | Anthony |
| 6,723,922 | B1 | * | 4/2004 | Shotey et al. ............. 174/66 |
| 7,208,687 | B2 |   | 4/2007 | Hetzer et al. |
| 2006/0170070 | A1 |   | 8/2006 | Hetzer et al. |
| 2006/0191210 | A1 |   | 8/2006 | Hetzer et al. |
| 2007/0117428 | A1 |   | 5/2007 | Mössner et al. |

FOREIGN PATENT DOCUMENTS

DE 198 43 225 3/2000

\* cited by examiner

*Primary Examiner*—Harry A Grosso
(74) *Attorney, Agent, or Firm*—Merchant & Gould P.C.

(57) ABSTRACT

The invention relates to a housing for receiving electric lines and/or connections, comprising a first housing part and a second housing part, said housing parts being connected to one another by means of at least one hinge. Said hinge defines a rotational axis about which the first housing part and the second housing part can pivot against one another, wherein a first hinge part of said hinge is affixed in the first housing part and wherein a second hinge part is affixed in the second housing part. One of the hinge parts is an axle extending in the direction of the rotating axis. The other hinge part is a fixing part extending in peripheral direction of the axle. At least one recess is arranged in one of the hinge parts while at least one protrusion is arranged in the other hinge part so that said protrusion engages in the recess in a given rotational position and/or in different rotational positions over a given rotational angle area.

16 Claims, 8 Drawing Sheets

FIG. 2

HOUSING

The invention relates to a housing for holding electrical cables and/or connections.

Housings such as these are used, for example, as wall outlet boxes in production workshops in the industrial field. These comprise a first housing part and a second housing part, for example with the first housing part being attached as the lower part to the wall, and with a second housing part being articulated, for example by means of a hinge on the first housing part. The second housing and/or the first housing part have one or more first openings, via which an electrical cable can be passed into the housing. Furthermore, the second housing part and/or the first housing part may have at least one second opening, in which an electrical socket is arranged. In this case, the socket can be placed in front of the second opening from the outside or from the inside. The electrical cable is then connected to the socket. An electrical and/or electronic appliance can then be connected to the cable by plugging a suitable plug into the socket, for example in order to receive and/or to transmit data in this way.

The invention is based on the technical problem of providing a housing in which work can easily be carried out on the electrical connections and/or connections in the interior of the housing.

The invention proposes that at least one depression be arranged on one hinge part, and that at least one projection be arranged on the other hinge part, so that the projection engages in the depression in one specific rotation position and/or in different rotation positions over a specific rotation angle range. The invention is in this case based on the discovery that it makes it easier to work on the connections or electrical connections in the interior of the housing if the housing parts can preferably be held (with respect to other rotation states) in specific rotation positions or specific rotation angle ranges. If, for example, a rotation position is preferred in which the housing is closed or is approximately closed, it is easy to lock or unlock the housing (for example by tightening or releasing a securing screw).

If a rotation position is preferred in which the housing is open, the actual installation work in the interior of the housing can be carried out more easily. The housing parts must preferably be rotated through at least 160° from a closed position of the housing in order to reach the preferred rotation position. An open preferred rotation position or rotation angle range is advantageous in particular for further installation work after initial installation. The housing parts remain connected to one another. Thus, for example, the second housing part need not be placed on the ground, which may be damp.

In particular, the projection can latch into the depression. However, this does not mean that a specific (defined) rotation position is reached in this way, which can be left only by removing the projection from the depression. In fact, the projection can also latch into a depression in which it can still move to other rotation positions.

The depression and/or the projection preferably extend/extends in a straight line or with straight-line edges, with the straight lines running parallel to the rotation axis. For example, the depression may have two such edges which are separated from one another in the circumferential direction by a specific constant angular separation, with the projection extending in a straight line, that is to say having only a small extent in the circumferential direction (for example 2-6 degrees).

By way of example, a projection on the outer circumference of the shaft interacts with a corresponding depression on the inner circumference of the attachment part in the described manner.

At least one further depression may be arranged on the hinge part by the depression, so that two or more rotation positions and/or rotation angle ranges are preferred. It is also possible to arrange at least one depression and at least one projection on the same hinge part, with one projection and one depression being arranged in a corresponding form on the other hinge part. This makes it possible, for example, to latch in at two different points on the circumference of the hinge parts, in which case the different points may correspond to the same preferred rotation position or the same preferred rotation angle range, or to different preferred rotations positions and/or preferred rotation angle ranges. Alternatively or additionally, it is possible for at least one further projection to be arranged on the hinge part with the projection. This makes it possible, for example, to set different preferred rotation states (rotation positions and/or rotation angle ranges) with just a single depression (or else with two or more depressions) on the other hinge part. For example, the projections may engage in the same depression individually or else at the same time. If, for example, only one projection is engaged in the depression and, at the same time, a second projection that is provided is not engaged in any depression, a "half-preferred" rotation state can be reached (that is to say there are not only rotation states which are better protected against a change in the rotation state, but also rotation states which are not secured as well against a change in the rotation state. If, on the other hand, two or more projections engage in the same depression or in different depressions at the same time, this results in a particularly preferred rotation state.

In particular, both the first hinge part and the second hinge part may have circumferential surfaces in the cross section which run essentially along a circular line. In this case, this form with a circular cross section relates to the outer circumference of the shaft and to the inner circumference of the attachment part. In this case, the projections and depressions relate to the comparison with an exactly circular-cylindrical circumferential surface.

The first hinge part may be both the shaft and the attachment part. The shaft (if present) is preferably attached to that housing part which is itself firmly connected to a further object (for example to a wall).

At least one hinge part may be made of plastic, for example of plastic which can be deformed thermoplastically, using the injection-molding process. Other materials such as metal may also be used.

In one particular refinement, the depression may extend in the circumferential direction, so that the projection engages in the depression over a rotation angle range. Not only is a single rotation position therefore preferred, but all the rotation positions in that rotation angle range. This results in advantages during manufacture of the hinge, since manufacturing tolerances do not have a disturbing effect and, in particular, specific desired rotation positions are preferred. Furthermore, this refinement allows the housing part to move within the preferred rotation angle range; for example if it abuts against a housing part, in the event of abutment against a housing part, it can move away again.

This rotation angle range may have one rotation position in which an opening in the housing is closed by interaction of the first housing part with the second housing part. The opening is, for example, virtually the same size as a complete housing cross section (for example through a lower part and/or through a housing part which is attached to a wall), and is closed by the second housing part (cover) in that rotation position.

Alternatively or in addition to the situation described above, the housing may be open in the specific rotation position and/or in the specific rotation angle range (that is to say the opening in the housing is accessible from the outside), with a mechanical resistance being formed by interaction of the depression with the projection, which must be overcome in order to move the second housing part and the first housing part to a rotation position in which the opening in the housing is closed.

In particular, the hinge may be designed such that one edge of the depression forms a mechanical resistance for the projection, with the resistance having to be overcome in the event of a rotary movement, in order to allow the projection to leave the depression. This relates not only to the preceding paragraph.

The depression and the projection preferably extend over only a part of the actual extent of the shaft in the direction of the rotation axis, so that a mechanical resistance is formed by interaction of the depression with the projection, which makes it difficult or impossible to leave the depression by movement of the projection in the direction of the rotation axis. In this refinement, it is possible to prevent the hinge parts and the housing parts being inadvertently disconnected from one another.

In one specific refinement, at least one first hinge part is in each case arranged on each of the mutually opposite faces (in particular outer faces) of the first housing part, so that the second hinge part can optionally be combined (articulated) together with the respective first hinge part on one face or on the other face, to form a hinge. For example, the hinge parts which are arranged on the opposite faces may be defined rotation axes parallel to one another. For example, depending on the installation location, it is thus possible to decide whether the hinge should be arranged on one face or the other.

The hinge may also be a split hinge, for example with two or more subareas of the hinge being separated from one another. In particular, two or more of the first and/or second hinge parts may be provided, with the two or more first and/or second hinge parts being arranged such that a common hinge with a defined rotation axis is formed or can be formed from them. This makes it possible to save space and material, with a hinge connection which is highly robust. In particular, the individual hinge subareas can be designed to be particularly mechanically robust.

The housing may be in the form of a wall outlet box, with the first housing part being in the form of a housing part which can be attached to a wall. In this case, the hinge may be designed and/or arranged such that the second housing part reaches a stop rotation position by pivoting about the rotation axis, in which the second housing part abuts against the first housing part and/or against an object which is connected to it, and can thus be designed such that the first hinge part is disconnected from the second hinge part when a sufficiently large torque, acting beyond the stop rotation position, occurs.

The housing is preferably designed such that the stop rotation position is reached before the second housing touches the wall, and such that the first hinge part is disconnected from the second hinge part when the torque occurs.

The invention will be explained in more detail in the following text with reference to a preferred exemplary embodiment. In the figures.

Figure 1:
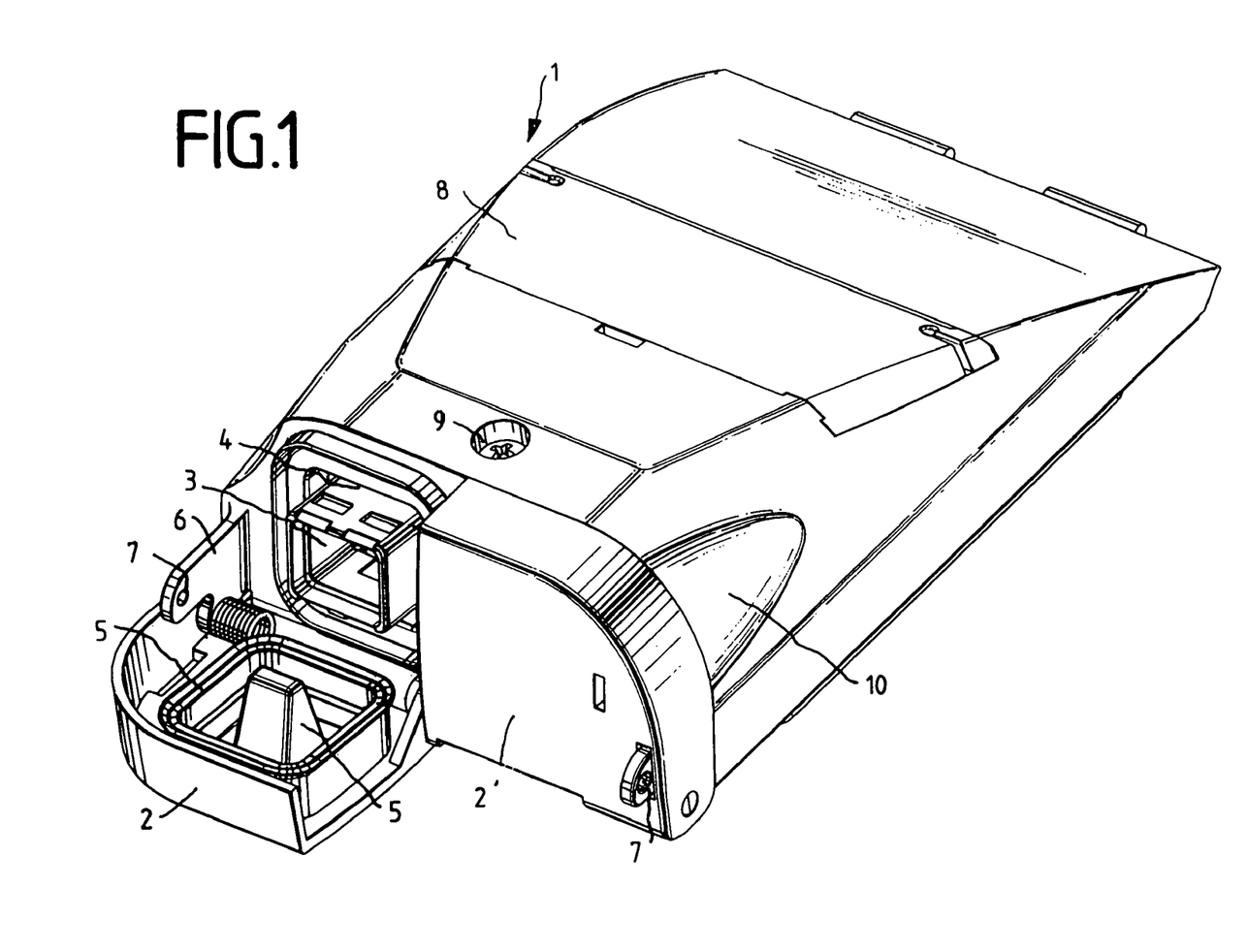
FIG. 1 shows a perspective plan view of a second housing part (housing cover)

FIG. 1 shows the second housing part 1 of a housing, with the housing being in the form of a wall outlet box. However, features and feature combinations of this embodiment can also be provided in other refinements. The second housing part 1 has two flaps 2, by means of which second openings 3 in an end surface of the cover 1 can be closed. In this case, the right-hand flap 2 is shown in the closed state, and the left-hand flap 2 is shown in the open state. An attachment 4 is inserted in the second opening and is matched to a plug that can be inserted. A connector is then arranged behind this attachment 4, as will be explained in more detail later. Sealing elements 5 are arranged on the inner face of the flap 2 and, in the closed state, protect the opening 3 with the attachment 4 hermetically against moisture and dirt. Two lead-sealing hooks 6 are arranged at the side on the end face and, when the flap 2 is in the closed state, project through openings in the flap 2. A wire can then be passed through holes 7 within the lead-sealing hooks 6 and can be lead-sealed, thus making unauthorized access more difficult and making it evident. An inscription area with a lid 8 is arranged on the upper face of the second housing part 1, as well as a hole 9 by means of which the second housing part can be screwed to the lower part. Troughs 10 are formed at the side on the second housing part 1 in the area of the flaps 2 and are used as intentional pressure points for opening the flap 2. The flaps 2 are on the one hand prestressed by means of a spring and are latched by means of a latching tab, which is not illustrated, on the second housing part and a latching trough on the flap. This then simplifies the unlatching, since force is applied obliquely via the troughs 10.

Figure 2:
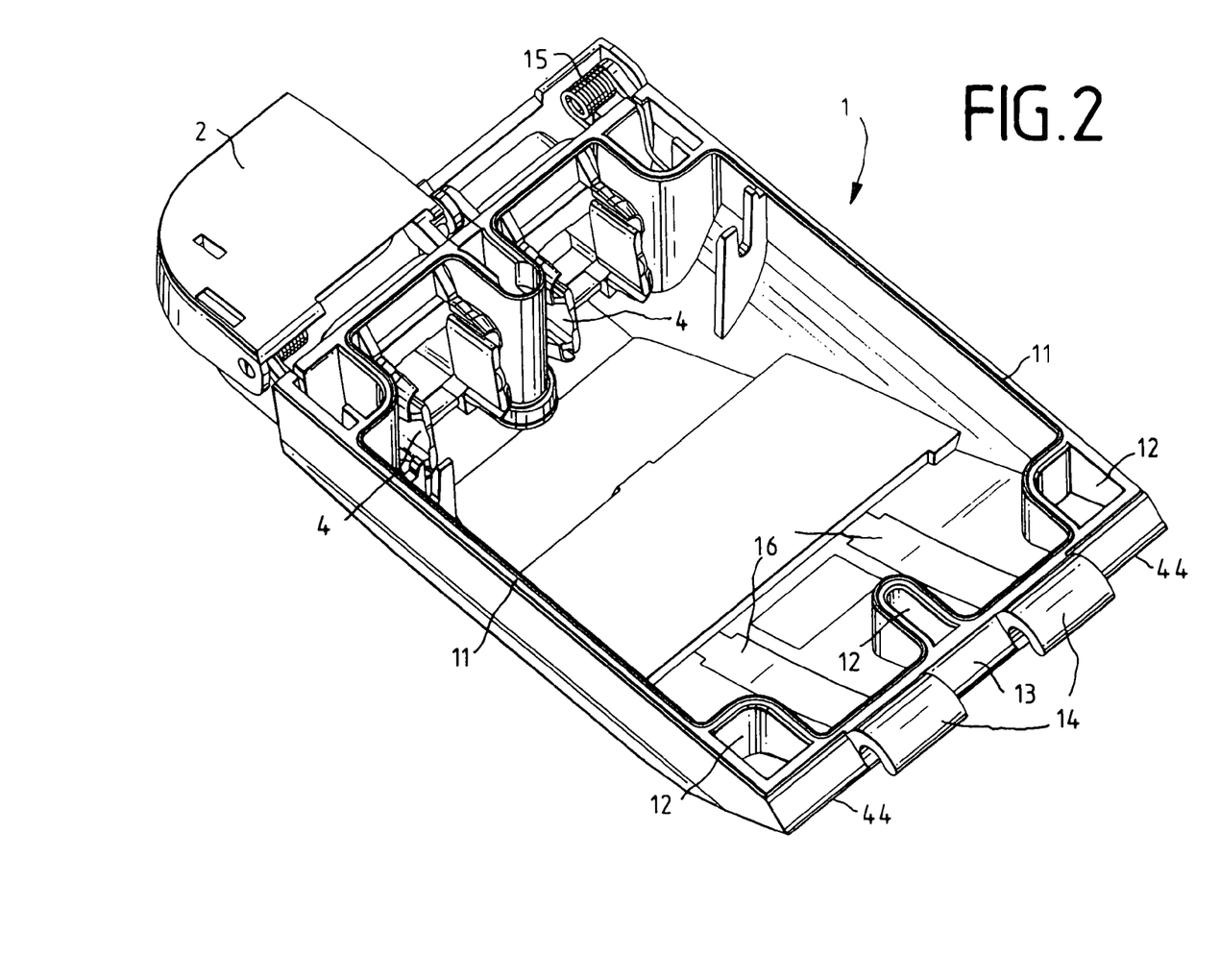
FIG. 2 shows a perspective lower view of the second housing part

FIG. 2 shows a view of the second housing part from underneath. In this case a groove 11 for sealing runs virtually over the entire circumference of the cover 1, with the holes 12 for screws being arranged away from the groove 11. Two attachment means 14 are arranged on the opposite end face 13 of the flaps 2. On the lower face, the attachment means 14 each have a latching tab, whose function will be explained later. As can also be seen, the two attachments 4 project into the second housing part. The spring 15 which prestresses the flap 2 can be seen at the top, on the right. Installation aids 16 are also fitted to the lower face of the housing part 1, which, for example, make it possible to see how far an electric cable must be cut off or stripped of insulation.

Figure 3:
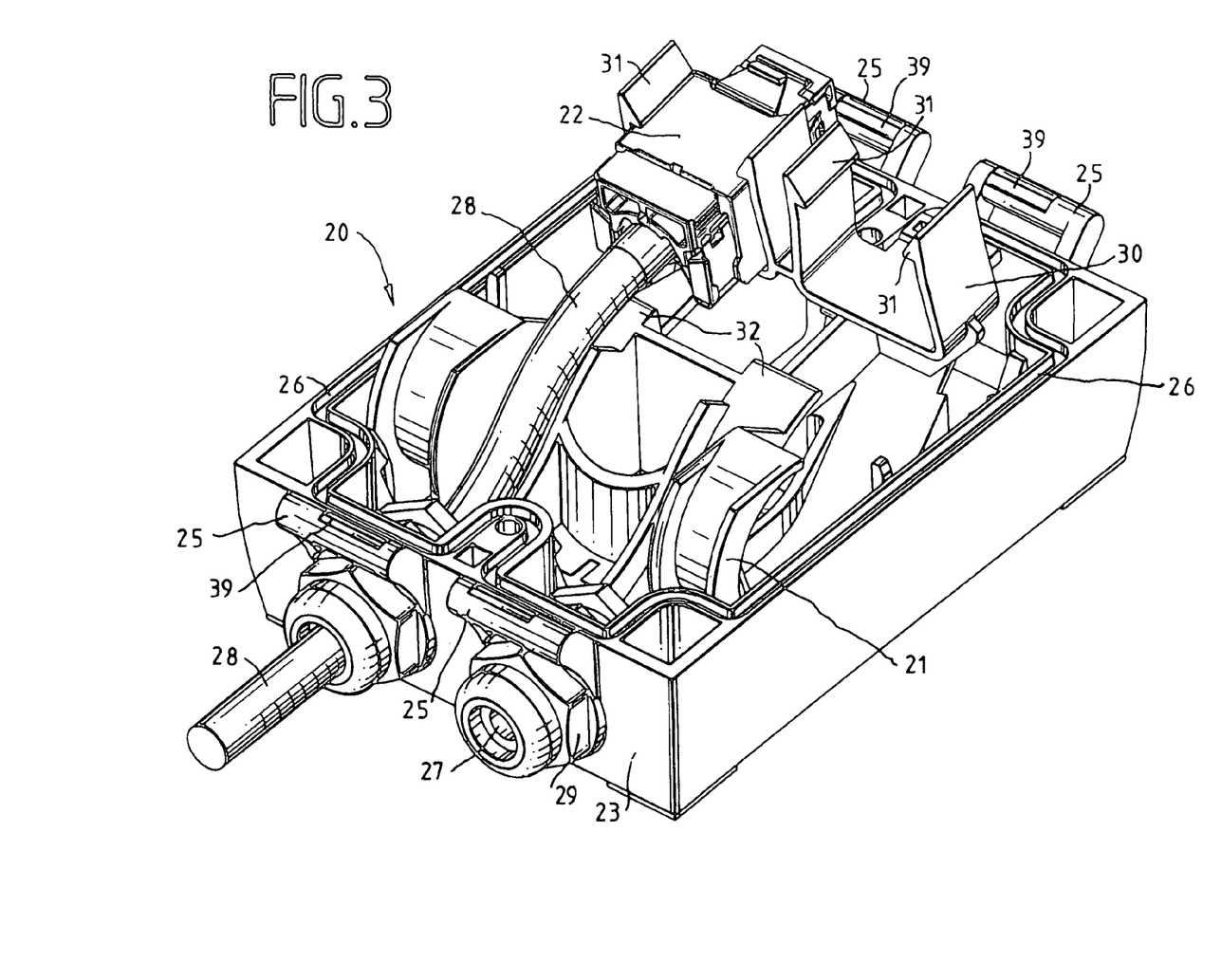
FIG. 3 shows a perspective plan view of a first housing part (housing lower part) with a cable routing element inserted, as well as sockets in a first operating mode.

FIG. 3 shows the first housing part 20 of the wall outlet box with a cable routing element 21 as well as sockets 2 inserted. Two shafts 25 are arranged on the respective two end faces 23 and 24 (see FIG. 5), and the housing part 1 can be hinged by means of the attachment means 14 on the shafts 25. A groove 26 for the seal 40 is provided virtually around the entire circumference of the lower part 20 (see FIGS. 4 and 5). On the end face 23, the lower part 20 has two first openings 27 for the electrical cables 28, and the openings 27 with the cables 28 can be sealed hermetically by means of sealing elements 29. The cable routing element 21 in each case has two U-shaped limbs 30, which are used for holding and securing the sockets 22. Clamping ribs 31 which point inwards are provided for this purpose on the upper face of the limbs 30 and slide over the upper face of the sockets 22. In a first operating mode, the cable routing element 21 is inserted into the lower housing part 20 such that the U-shaped limbs 30 rest on the end face 24. This is illustrated in FIG. 3. In this case, the cover 1 is hinged by means of the attachment means 14 on the shafts 25 on the end face 23. This means that, when the wall outlet box is mounted on the wall and the electrical cables 28 come from above, then the tapping by means of the plug 25, which are not illustrated, is produced from underneath. In order to route the electrical cable 28 in a defined manner within the wall outlet box, it is passed through the opening 27, is passed via a first cable routing path 32 from the opening 27 to the socket 22, where the electrical wires in the cable 28 are connected. The shafts 25 each have a depression 39, which is preferably arranged somewhat eccentrically and does not extend over the entire length of the shaft 25 in its longitudinal direction. Furthermore, a further depression 42, a latching depression, is provided in each of the shafts 25, and is located on the rear face of the shaft 25 in the view shown in FIG. 3. The latching depression 42 can be seen well from FIGS. 8 to 10. The latching depression 42 also extends over only a part of the length of the shaft 25. The lengths and positions of the latching depression 42 and of the depression 39 in the longitudinal direction are the same, so that a corresponding projection 43 on the attachment part 14 can latch with its entire length both into the depression 39 and into the latching depression 42. When the second housing part 1 is folded up from the closed position of the housing beyond a cut-off angle of, for example 160°, the projection 43 on the attachment 14 slides into the latching depression 42, and secures the second housing part 1 against being rotated back inadvertently to the closed position.

The cable routing path 32 is designed such that minimum bending radii of the electrical cable 28 for high data transmission rates, such as Category 6, are complied with. As can be seen well, particularly in FIG. 6, the configuration of the cable routing path 32 results in positive routing, so that the technician cannot bend the cable 28 at less than the minimum bending radii, and cannot kink it at all.

Figure 4:
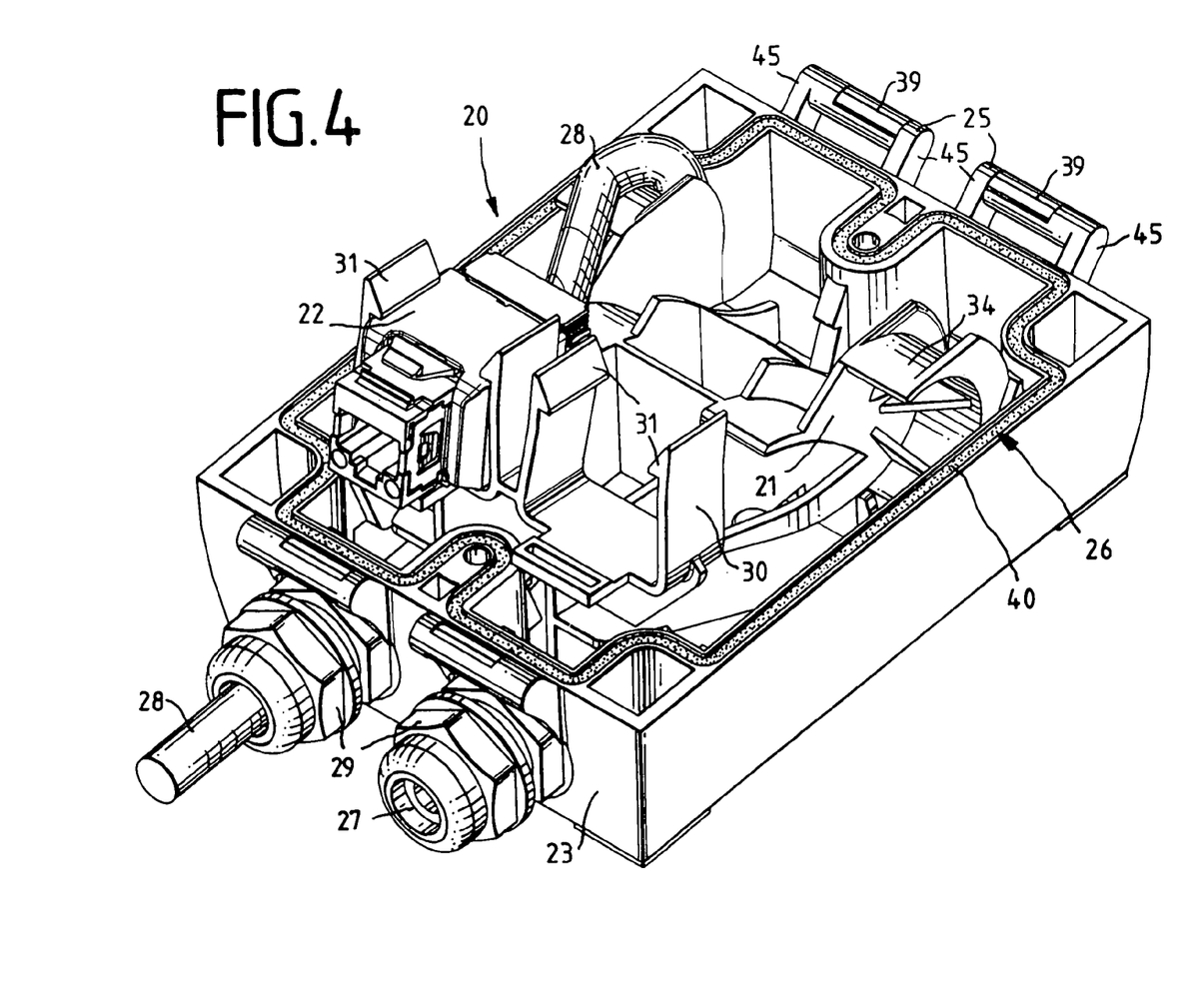
FIG. 4 shows a perspective plan view of the first housing part with a cable routing element inserted, as well as sockets in a second operating mode.
Figure 5:
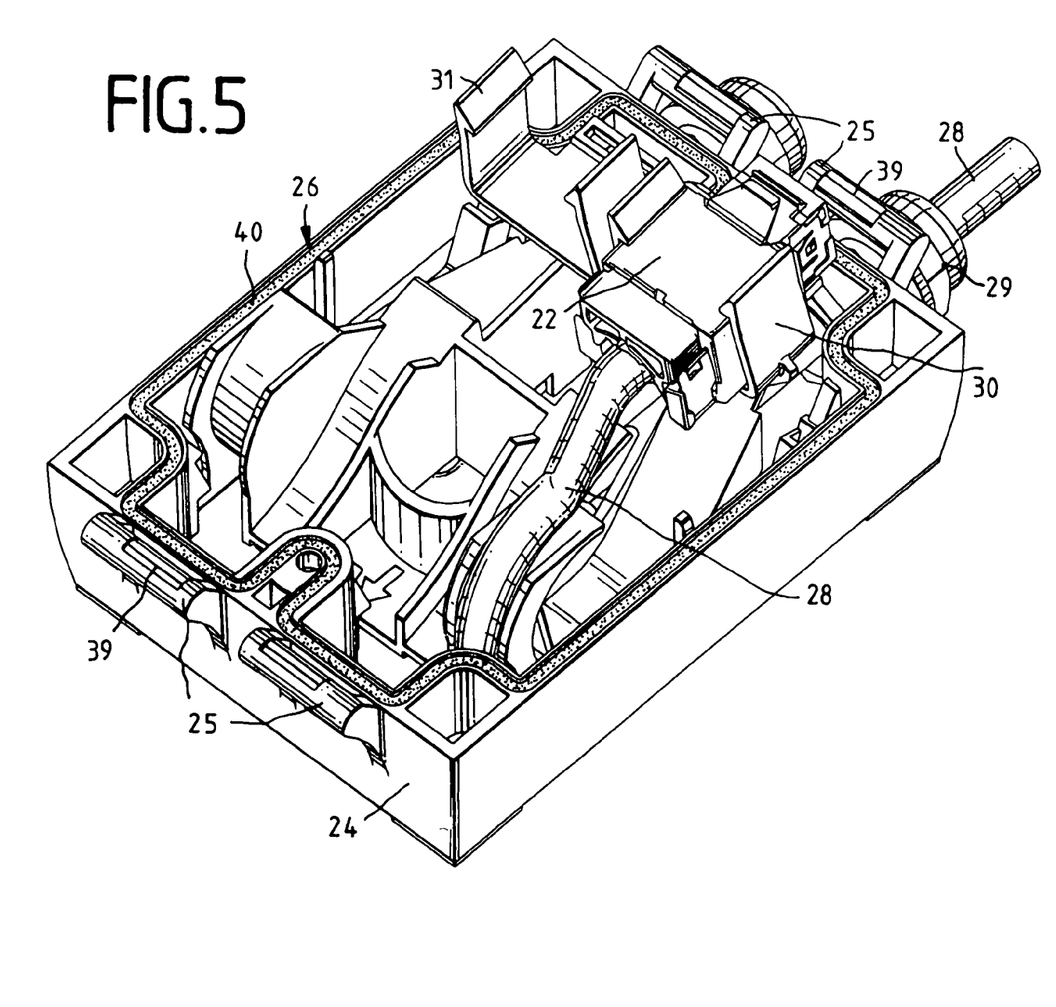
FIG. 5 shows a further perspective plan view of the first housing part.

FIGS. 4 and 5 show a second operating mode, in which the cable routing element 21 is arranged rotated through 180° in the lower housing part 21, so that the U-shaped limbs 30 are arranged on the end face 23. In this case, the second housing part 1 is hinged by means of its attachment means 14 on the hinge-like shafts 25 on the end face 24. However, this requires different cable routing within the wall outlet box. For this purpose, the electrical cable 28 is first of all passed from the opening 27 via the cable routing path 33 (see FIG. 6) from the end face 23 to the end face 24, where it is bent up and is passed via the cable routing path 34 to the socket 22.

The tapping by means of the plug can thus be provided optionally on the end face 23 or 24 by means of the detachable cable routing element 21 as well as the shafts 25 which are arranged on the two end faces 23, 24. If, by way of example, the wall connecting box is mounted on the wall and the electrical cable 28 comes from underneath, then the second operating mode as shown in FIGS. 4 and 5 nevertheless makes it possible to ensure that the tapping by means of the plug 25 is also feasible from underneath.

Figure 6:
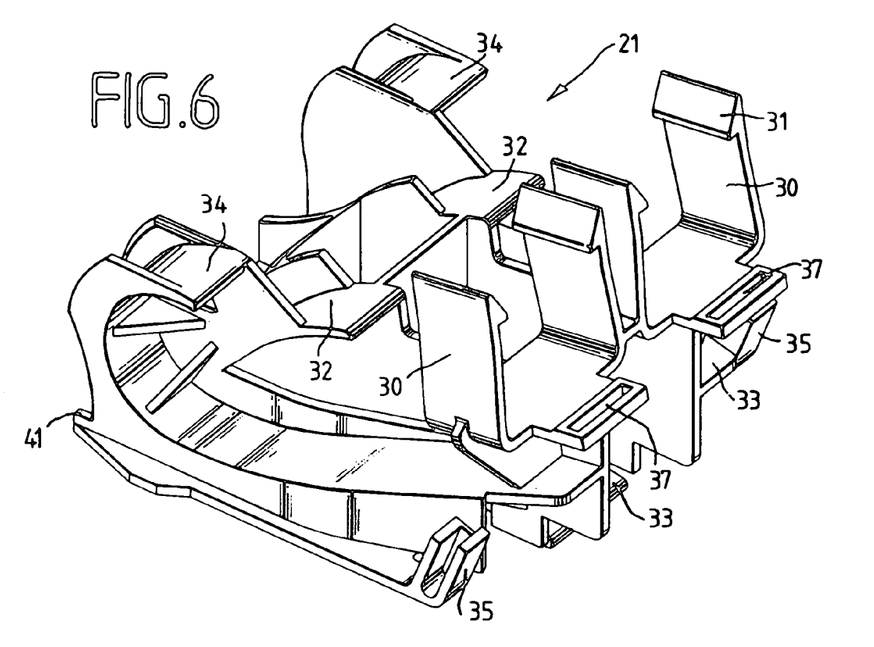
FIG. 6 shows a perspective plan view of the cable routing element.
Figure 7:
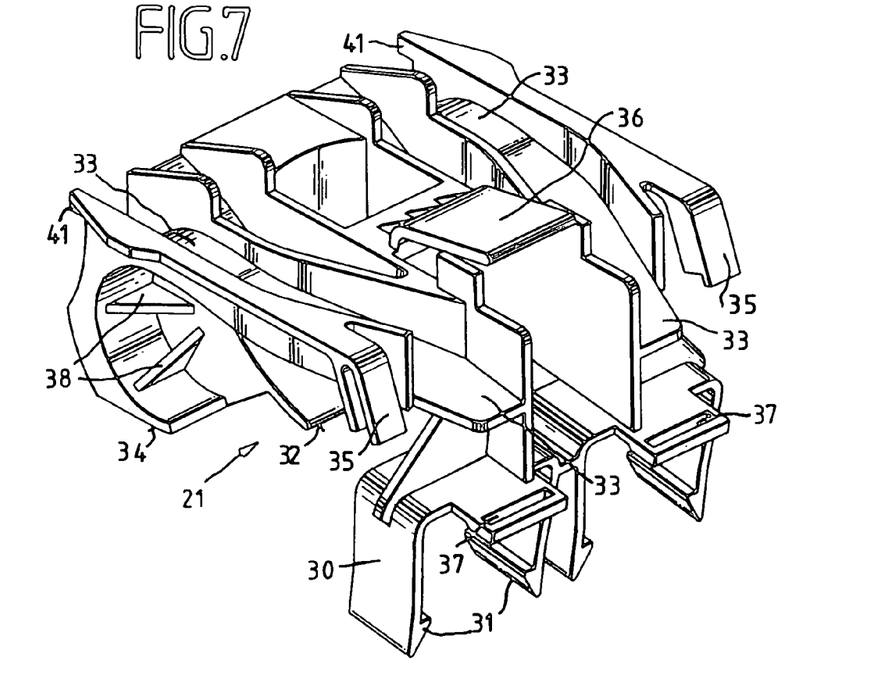
FIG. 7 shows a perspective view of the cable routing element from underneath.

The cable routing element 21 is illustrated in detail in FIGS. 6 and 7. In addition to the elements which have already been described, the preferably integral cable routing element 21 has a pair of spring elements 35 which press the cable routing element 21 in a sprung manner against the inner face of the first lower housing part 20. The cable routing element 21 also has a second spring element 36, which supports the cable routing element 21 is a sprung manner against the lower face of the lower part. In this case, the spring element 36 provides height alignment for the sockets 22, with the socket 22 being fixed in the longitudinal direction primarily by means of the stop edges 37. In order to increase the stiffness, the cable routing element 21 also has reinforcing ribs 38 in the area of the cable routing path 34. On the side opposite the spring elements 35, the cable routing element 21 has projections 41, which latch into corresponding recesses in the lower part 20.

Figure 8:
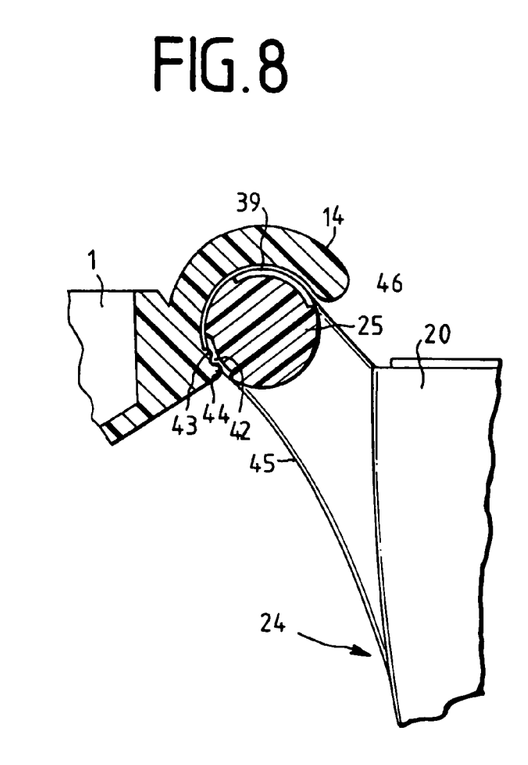
FIG. 8 to FIG. 10 show a side view with partially section areas of a hinge in different rotation positions.
Figure 9:
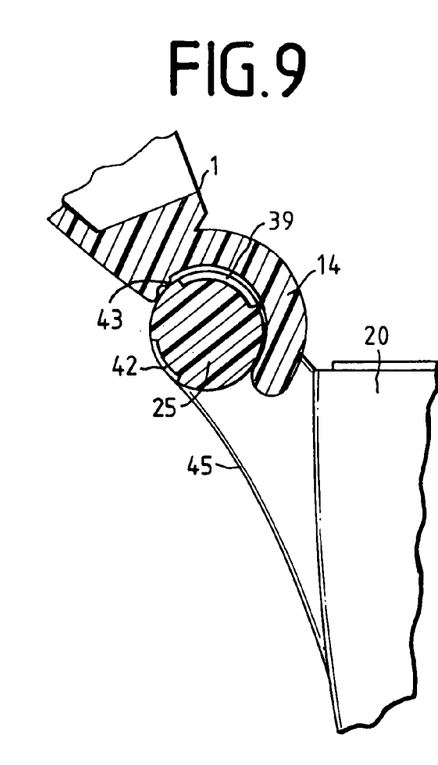
Figure 10:
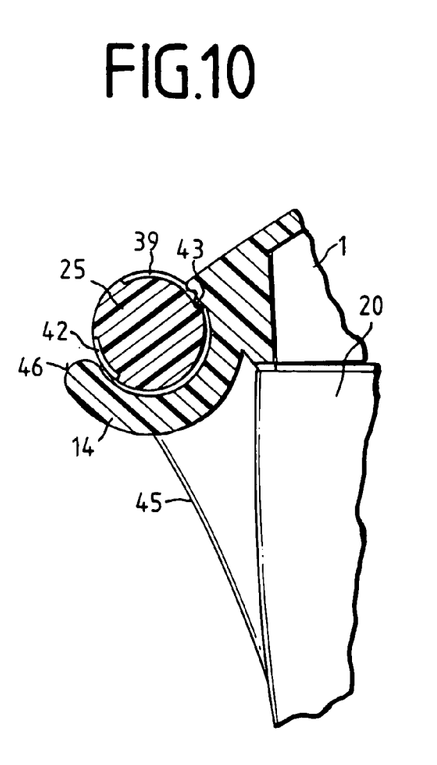

FIG. 8 to FIG. 10 show a hinge area of the wall outlet box, with the first housing part 1 being articulated on the end face 24 of the second housing part 20. The attachment part 14, which is illustrated partially (shaded area) in the form of a section surrounds the shaft 25 in the circumferential direction over an angle range of somewhat more than 180 degrees. As can be seen, the depression 39 extends over an angle range of about 90 degrees. In contrast, the depression 42 extends over an angle range of only about 35 degrees. The shaft 25 is connected to the first housing part 20 via a number of web-like transitional areas 45 (as can be seen particularly well in FIG. 4, as well). In particular, the entire first housing part 20 and the entire second housing part 1 are each produced integrally using the injection-molding process.

The projection 43 on the inner circumference of the attachment part is arranged shortly (about 3 to 10 degrees) in the circumferential direction before the end of the area which surrounds the shaft 25, to be precise at that end at which this area is connected to the second housing part.

FIG. 10 shows the first housing part 20 and the second housing part 1 with the wall outlet box in a virtually completely closed rotation position. As can be seen, the projection 43, which has a stud-like cross section, is engaged in the depression 39 and, at the same time, is virtually resting on the edge of the depression 39. If the second housing part 1 is rotated about the rotation axis (in the counterclockwise direction in FIG. 8 to FIG. 10, the housing is opened increasingly, and increasingly releases the opening in the first housing part 20. In the process, shortly before reaching the rotation position illustrated in FIG. 9, the projection 43 leaves the depression 39 with the attachment part 14 being slightly deformed. The attachment part 14 is thus located in the rotation position illustrated in FIG. 9, resting in a slightly clamped form on the outer circumference of the shaft 25. The clamping offers a small amount of resistance to further rotational movement. Shortly before reaching the rotation position illustrated in FIG. 8, the projection 43 latches into the latching depression 42. In the process, the material of the attachment part 14 is relieved of stress. The latching-in process prevents the second housing part 1 from inadvertently rotating back again to the closed position of the wall outlet box.

If the second housing part 1 is rotated even further (in this case in the counterclockwise direction) about the rotation axis of the shaft 25, the edge 44 (FIG. 2) of the attachment part 14 abuts against the transitional area 45, and the attachment parts 14 can be levered away from the shafts 25 by application of an appropriately high torque, so that the attachment parts 14 no longer surround the shafts 25. Alternatively, another area of the second housing part 1 can also abut against an object which is connected to the first housing part 20, for example the sealing elements 29, and can be levered out.

Figure 11:
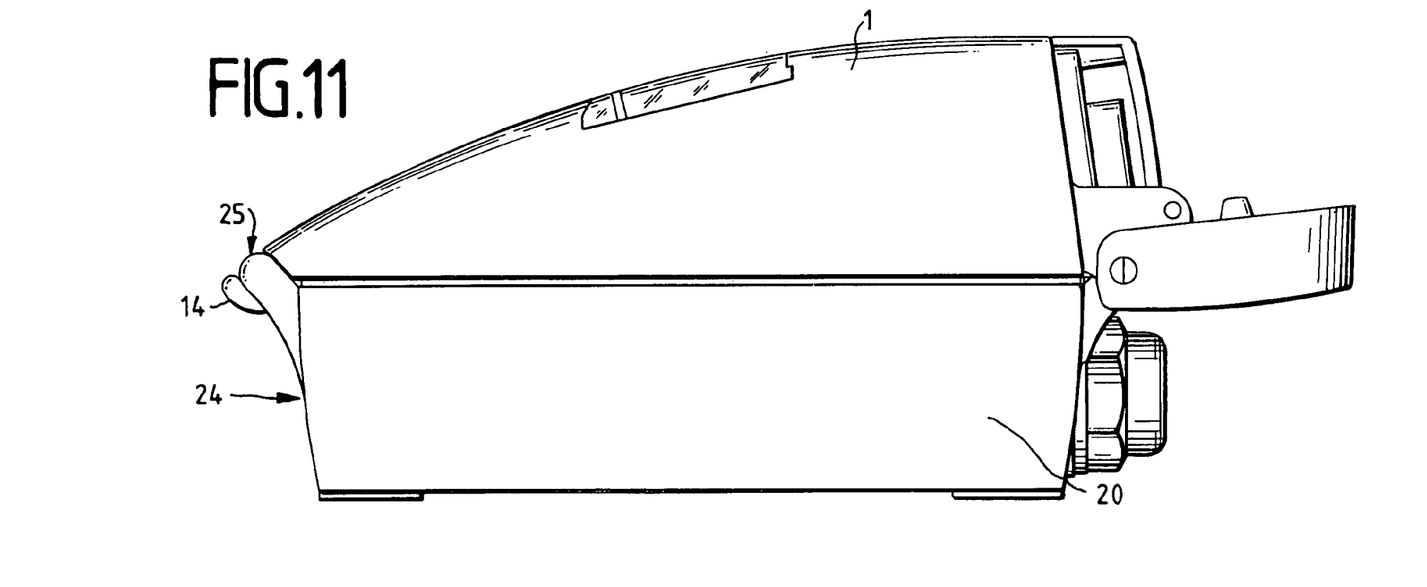
FIG. 11 shows a side view of the closed housing.

FIG. 11 shows the arrangement in the rotation position shown in FIG. 10.

Figure 12:
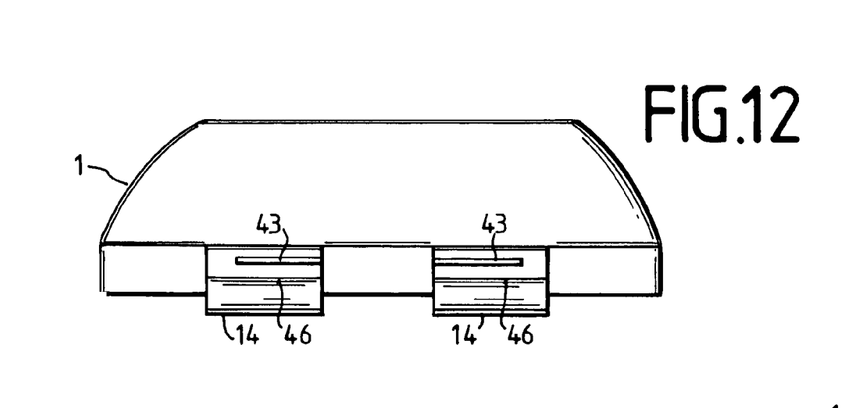
FIG. 12 shows a view of the end face of the second housing part.

FIG. 12 shows the second housing part 1. This shows the two attachment parts 14, which project from the end face, with their free ends 46 and the projections 43, which extend over only a part of the length of the respective attachment part 14.

LIST OF REFERENCE SYMBOLS

1. Second housing part (cover)
2. Flap
3. Opening
4. Attachment
5. Sealing element
6. Lead-sealing hook
7. Holes
8. Lid
9. Hole
10. Troughs
11. Groove
12. Holes
13. End face
14. Attachment part
15. Spring
16. Installation aids
20. First housing part (lower part)
21. Cable routing element
22. Sockets
23. End face
24. End face
25. Shafts
26. Groove
27. Opening
28. Cable
29. Sealing element
30. U-shaped limbs
31. Clamping ribs
32. Cable routing path
33. Cable routing path
34. Cable routing path
35. Spring element
36. Spring element
37. Stop edge
38. Reinforcing ribs
39. Depression
40. Seal
41. Projection
42. Latching depression
43. Projection
44. Edge
45. Transitional area
46. End

The invention claimed is:

1. A housing for holding electrical cables and/or connections, comprising:
a first housing part and a second housing part which are connected to one another via at least one hinge, the hinge defining a rotation axis about which the first housing part and the second housing part are configured to be pivoted with respect to one another,
wherein at least a first hinge part of the hinge is attached to mutually opposite end faces of the first housing part and at least a second hinge part of the hinge is attached to one end face of the second housing part, wherein the end face of the second housing part has a different configuration from an opposite end face of the second housing part, one of the hinge parts being a shaft which extends in a direction of the rotation axis, and the other of the hinge parts being an attachment part which extends in a circumferential direction of the shaft;
wherein the second hinge part on the one end face of the second housing part is configured to attach selectively to the first hinge part on either one of the opposite end faces of the first housing part to form the hinge; and
wherein at least one depression is arranged on the first hinge part and at least one projection is arranged on the second hinge part, such that the projection engages in the depression in a specific rotation position and/or in different rotation positions over a specific rotation angle range;
wherein the housing is in the form of a wall outlet box, the first housing part being designed as a housing part which is configured to be attached to a wall, and wherein the hinge is designed such that the second housing part reaches a stop rotation position by pivoting about the rotation axis, in which the second housing part abuts against the first housing part and/or against an object to which the first housing part is connected, and, when a sufficiently large torque acting beyond the stop rotation position occurs, the first hinge part is disconnected from the second hinge part;
wherein the housing is designed such that the stop rotation position is reached before the second housing part touches the wall, and wherein the first hinge part is disconnected from the second hinge part when the torque occurs.

2. The housing as claimed in claim 1, wherein the depression extends in the circumferential direction such that the projection engages in the depression over a rotation angle range.

3. The housing as claimed in claim 2, wherein the rotation angle range has one rotation position in which an opening in the housing is closed by interaction of the first housing part with the second housing part.

4. The housing as claimed in claim 1, wherein the hinge is designed such that one edge of the depression forms a mechanical resistance for the projection, with the resistance having to be overcome during a rotary movement in order to allow the projection to leave the depression.

5. The housing as claimed in claim 1, wherein the housing is open when the depression and projection are in the specific rotation position and/or in the specific rotation angle range, with a mechanical resistance being formed by interaction of the depression with the projection, which must be overcome in order to move the second housing part and the first housing part to a rotation position in which an opening in the housing is closed.

6. The housing as claimed in claim 1, wherein the depression and the projection extend over only a part of an axial extent of the shaft in the direction of the rotation axis, so that a mechanical resistance is formed by interaction of the depression with the projection, which inhibits movement of the projection out of the depression in the direction of the rotation axis.

7. The housing as claimed claim 1, wherein two or more of the first and/or second hinge parts are provided, with the two or more first and/or second hinge parts being arranged such that a common hinge with a defined rotation axis is formed or can be formed from them.

8. A housing for holding electrical cables and/or connections, comprising:
- a housing portion defining an interior and including mutually opposite end faces, each end face including at least one shaft defining a rotation axis, each shaft defining at least one depression; and
- a cover having opposite end faces, a first of the end faces not including an attachment part, and a second of the end faces including at least one attachment part that is configured to attach selectively to the shaft on either of the end faces of the housing portion to enable the cover to pivot relative to the housing portion, the attachment part extending in a circumferential direction of the shaft, and the attachment part including a projection configured to engage the depression defined in the shaft to which the attachment part is selectively attached;
- wherein the projection engages the depression to position the cover in at least one specific rotation position relative to the housing portion.

9. The housing as claimed in claim 8, wherein the projection engages the depression to position the cover in different rotation positions over a specific rotation angle range relative to the housing portion.

10. The housing as claimed in claim 8, wherein the housing defines a wall outlet box, and wherein the housing portion is configured to be attached to a wall.

11. The housing as claimed in claim 10, wherein the hinge is designed such that the attachment part reaches a stop rotation position relative to the shaft by pivoting about the rotation axis, wherein the attachment part is disconnected from the shaft when a sufficiently large torque acts to move the attachment part beyond the stop rotation position.

12. The housing as claimed in claim 11, wherein the attachment part reaches the stop rotation position before the cover touches the wall.

13. A housing for holding electrical cables and/or connections, comprising:
- a housing portion defining an interior and including mutually opposite end faces, a first of the end faces defining first openings through which electrical cables pass, a second of the end being closed, each end face including at least one shaft defining a rotation axis; and
- a cover having first and second ends, the first end of the cover including at least one attachment part that is configured to attach selectively to the shaft on either of the end faces of the housing portion to enable the cover to pivot relative to the housing portion, the second end of the cover defining second openings through which electrical plugs are inserted.

14. The housing as claimed in claim 13, wherein the attachment part of the cover is attached to the shaft of the first end face of the housing, whereby the electrical cables and the electrical plug enter the housing from a common side of the housing.

15. The housing as claimed in claim 13, wherein the attachment part of the cover is attached to the shaft of the second end face of the housing, whereby the electrical cables and the electrical plug enter the housing from different sides of the housing.

16. The housing as claimed in claim 13, wherein each shaft defines at least one depression and the attachment part of the cover includes a projection configured to engage the depression defined in the shaft to which the attachment part is selectively attached.

* * * * *